Dec. 8, 1959

M. ALDEN

STYLUS RECORDER 2,916,343

Filed June 14, 1954

5 Sheets-Sheet 1

INVENTOR.
Milton Alden
BY
Davis, Hoxie & Faithfull

INVENTOR.
Milton Alden
BY
Davis, Hope & Faithfull

INVENTOR.
Milton Alden
BY
Davis, Hoxie & Faithfull

Dec. 8, 1959

M. ALDEN 2,916,343

STYLUS RECORDER

Filed June 14, 1954

5 Sheets-Sheet 4

INVENTOR.
Milton Alden
BY
Davis, Hoxie & Faithfull

INVENTOR.
Milton Alden
BY
Davis, Hoxie & Faithfull

2,916,343
STYLUS RECORDER

Milton Alden, Wellesley, Mass.

Application June 14, 1954, Serial No. 436,495
19 Claims. (Cl. 346—49)

This invention relates to recorders and more particularly to recorders of the type wherein are provided one or more stylus electrodes for marking on a recording medium.

Objects of this invention are to provide a recorder in which each of the stylus electrodes is self-adjusting to compensate for wear, in which the stylus electrodes can be lifted to facilitate the insertion of the web of recording material, in which the stylus electrodes can be individually replaced as required quickly and easily without the necessity of special tools or skill, and in which multiple connecting means are provided for each stylus electrode. Further objects are to provide a recorder which is simple in construction and operation, which is built up of several readily replaceable sub-assemblies, which is adapted for a wide variety of uses, which provides a large number of separate recording channels, which can be readily and easily connected to a plurality of input circuits or channels, and which advances the recording art generally.

A recorder according to the present invention includes a plurality of recording stylus electrodes the tips of whose effective portions contact the surface of a recording medium such as a web of electrosensitive material as the web is moved along a predetermined path through the recorder. Each stylus electrode is provided with a respective resilient element for yieldably urging the effective contact tip towards a common bar electrode located upon the opposite side of the web of recording material. Means are provided for connecting each of the stylus electrodes to one of the output terminals of a respective external recording circuit or channel. Such means preferably includes a terminal board or block having several different types of connectors for each circuit. The other output terminal of each of the external recording circuits is connected with the common bar electrode so that a marking current flows through the electrosensitive medium when the recording circuits are energized. The stylus electrode assembly is preferably replaceable as a unit and comprises a strip or wire of an electrically conducting material whose length is relatively great with respect to its transverse dimensions. The stylus strip is enclosed in a housing of a non-conducting material which is preferably sector-shaped so that only the effective recording tip protrudes to provide support against lateral deflection of the effective portion and insure definite registry of its tip. Resilient means, which is preferably a spiral configuration of the stylus strip to form a spring, provides the marking pressure with which the tip engages the electrosensitive material so that an electric current will flow therethrough and also serves to advance the tip to compensate for wear and erosion occurring during the recording process.

These and other objects and aspects of the invention will be apparent from the following description of a specific embodiment of the invention which refers to drawings wherein.

Figure 1:
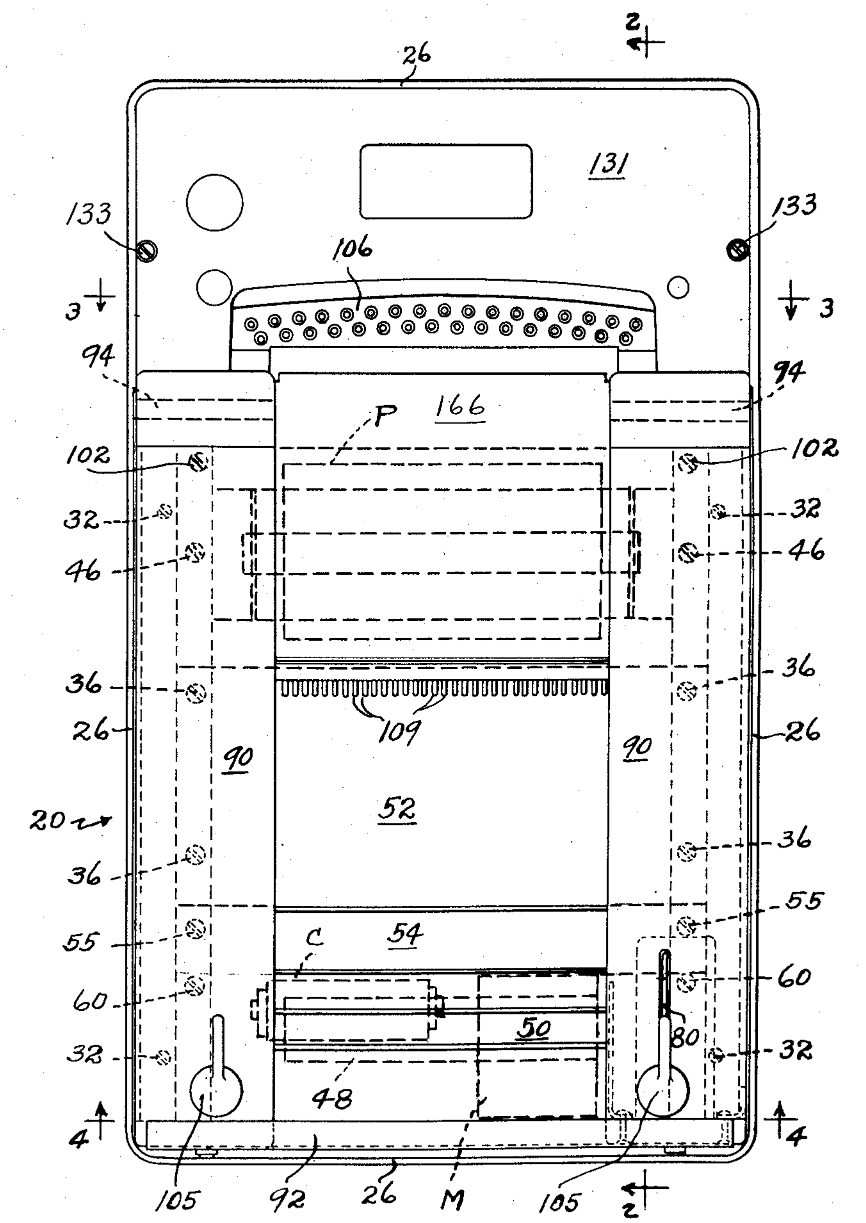
Fig. 1 is a plan view of the recorder.
Figures 2, 3:
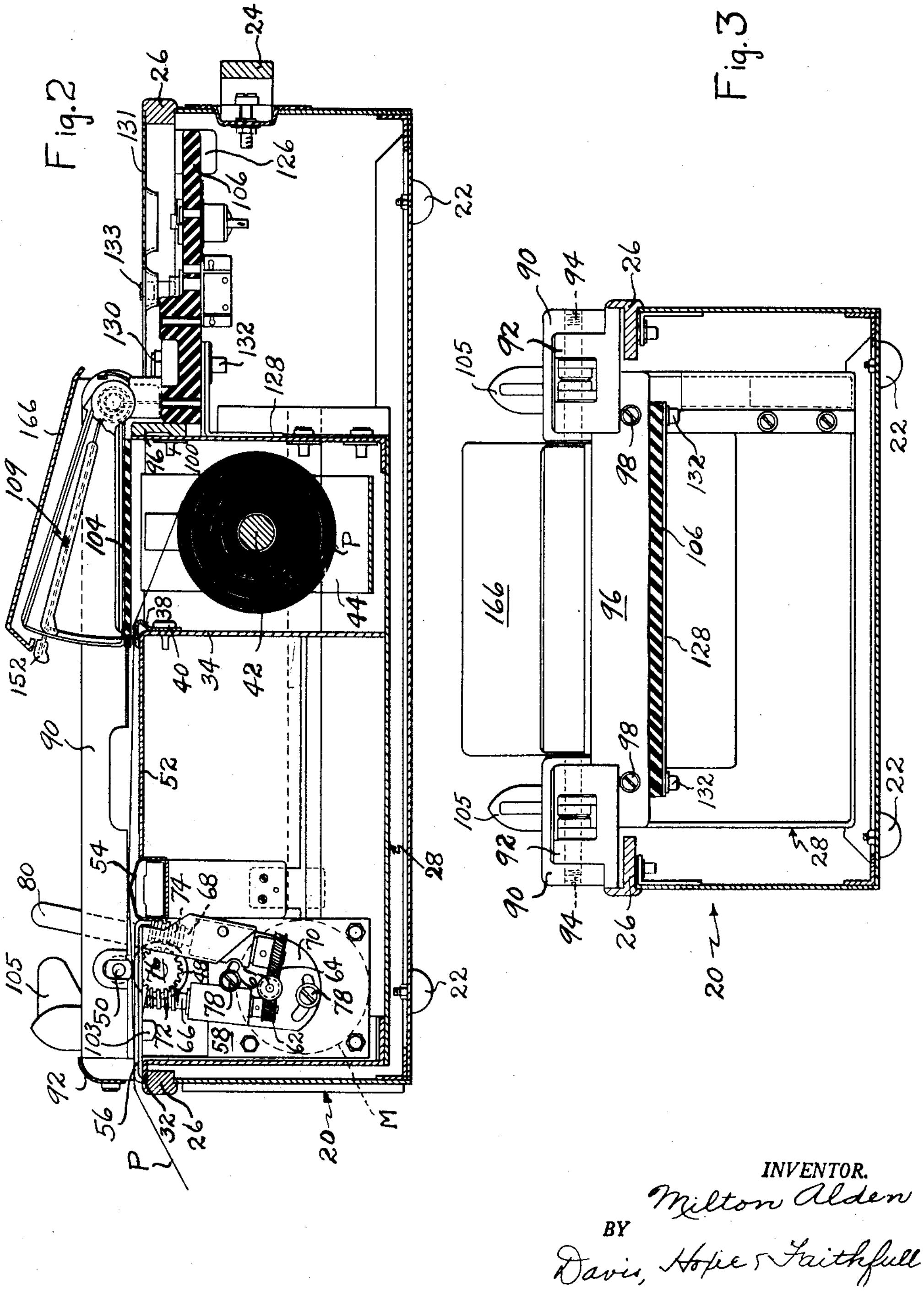
Fig. 2 is a sectional view on the line 2—2 of Fig. 1.
Fig. 3 is a sectional view on the line 3—3 of Fig. 1.
Figure 4:
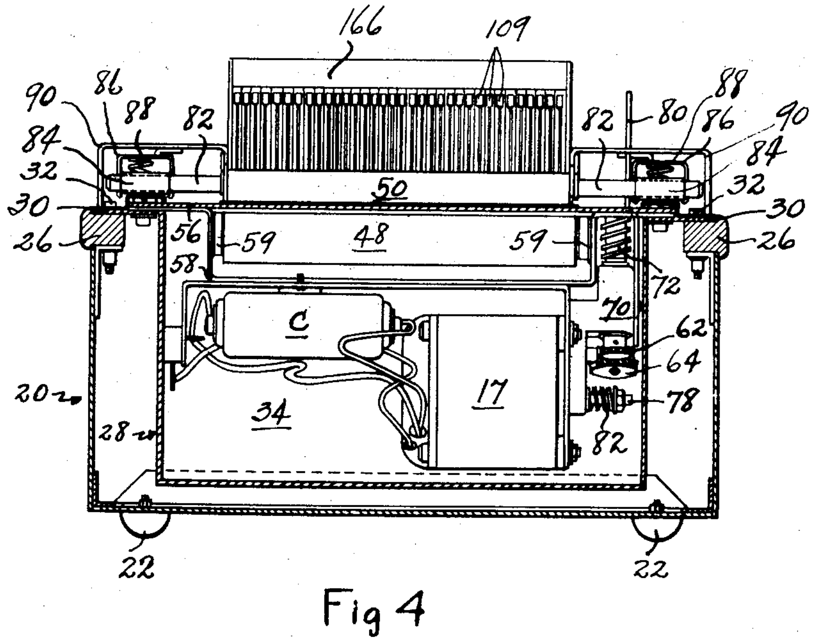
Fig. 4 is a sectional view on the line 4—4 of Fig. 1.

As is best shown in Figs. 2 to 4, the operating elements of the recorder are enclosed in a rectilinear housing 20 constructed of sheet metal and having four feet 22 of a soft-non-marring material such as rubber. A handle 24 for lifting and carrying the recorder is secured in a recess in one end wall of the housing 20. Disposed about the top edge of the housing 20 is a boss 26 from which is suspended an inner sheet metal enclosure 28 by means of its outwardly turned lip 30 and screws 32 (Fig. 1). The enclosure 28 is divided into two compartments by the vertical portion of an L-shaped bar electrode support 34 (Fig. 2). One of the compartments holds the supply of electrosensitive material and the other compartment the feeding mechanism therefor as will be described in detail below. The horizontal portion of the bar electrode support 34 is wide enough to overlap the enclosure lips 30 and is provided with apertures through which screws 36 (Fig. 1) project to engage nuts welded to the bottom of the lips thereby to secure the bar electrode support. A bar electrode 38, which is at the ground potential of the housing 20 and inner enclosure, is secured to the apex of its support 34 by screws 40. As mentioned above, the right hand compartment formed by the vertical portion of the bar electrode support 34 houses a roll of electrosensitive recording material such as the web P of recording paper which is of the type whose color is changed by the passage of an electrical current therethrough. The roll is wound upon a core 42 whose ends engage slots in the opposite sides of a U-shaped bracket 44 with outwardly turned lips which are secured to the top of the enclosure lips 30 by screws 46 (Fig. 1).

The web moving mechanism includes a lower feed roll 48 driven by a mechanism to be described in detail below and a spring loaded upper idler feed roll 50 which cooperates with the lower feed roll to unwind the web P from the supply roll and draws the unwound portion over a pathway defined by the bar electrode 38, an apron 52 for the enclosure 28, an electrically heated paper drying mandrel 54 suspended from the enclosure lip 30 by screws 55, the line of contact of the feed rolls 48 and 50 and a slotted cover plate 56 disposed over the web-moving mechanism for the lower feed roll.

Power for the web-moving mechanism is obtained from an electric motor M having an associated capacitor C both of which are suspended from a bracket 58 secured to the enclosure lip 30 by screws 60 (Fig. 1), the bracket also holding the ball bearings 59 for the feed roll 50. The shaft of the motor M has a worm 61 (Fig. 2) attached thereto so as to engage simultaneously two gears 62 and 64 carried respectively at the ends of two shafts 66 and 68 which are journalled in bosses of a casting 70. At the opposite ends of the gear shafts 66 and 68 are attached two worms 72 and 74 respectively. In the illustrated position of the gear drive casting 70, the worm 72 engages a gear 76 upon the shaft of the lower feed roll 48 whereas there is a clearance between the teeth of the gear 76 and the worm 74. The casting 70 is pivotally mounted by means of two screws 78 which pass through slots in the casting to engage the bracket 53. Because of the clearance provided by the slots, the casting 70 can be manually rotated about the axis of the motor shaft in a counterclockwise direction by means of a handle 80 to disengage the worm 72 from the feed roll gear 76 thereby to stop the rotation of the feed roll 48. Further counterclockwise movement of the casting 70 brings the worm 74 into engagement with the gear 76 to again start the feed roll 48. In the latter position of the casting the speed of rotation of the feed roll 48 is lower than in the former case because of the differences in size of the gears 62 and 64 which engage the worm 61.

With the above described unit construction it will be apparent that it is possible by the use of no tools other than a screw driver to loosen the screws 32 and to remove and replace the enclosure 28 and the entire paper feed assembly quickly and easily. Similarly the removed assembly can be serviced by replacing any of its components by removing the screws 36, 46, 55 or 60 as the case may be.

The shaft 82 (Fig. 4) of the upper feed roll 50 is journalled in sleeve bearings 84 carried upon the ends of arms pivotally attached to bearing brackets 86 and urged downwardly by springs 88 so the upper roll 50 is brought into forcible contact with the lower driven roll 48. The bearing brackets 86 are secured to the undersurface of two channel-shaped members such as the arms 90 that are joined at their forward end by a connecting strip 92 (Fig. 1) to form a cover for the recorder whose center portion is open to form a window for viewing the copy recorded upon the web P. The back ends of the arms 90 are pivotally connected to hinge blocks 92 by pintles 94 (Fig. 3). The hinge blocks 92 are interconnected by an integrally cast piece 96 that is secured by cap screws 98 which engage nuts 100 (Fig. 1) fixed to the inner surface of the end wall of the enclosure 28. Two additional screws 102 pass through apertures in the enclosure side lips 30 to engage holes tapped in bosses extending from the hinge blocks 92 beneath the ends of the lips. The arms 90 are secured in their closed positions by barrel cam detents 103 which are operated by knobs 105. Also hinged upon the pintles 94 is a plate 104 of a nonconducting material such as a suitable plastic which acts as a cover for the paper supply compartment to help maintain the moisture content of the roll of paper.

Figure 13:
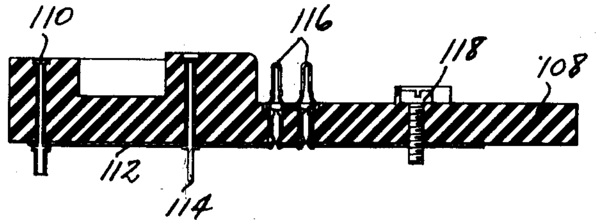
Fig. 13 is a sectional view on the line 13—13 of Fig. 11.
Figures 11, 12:
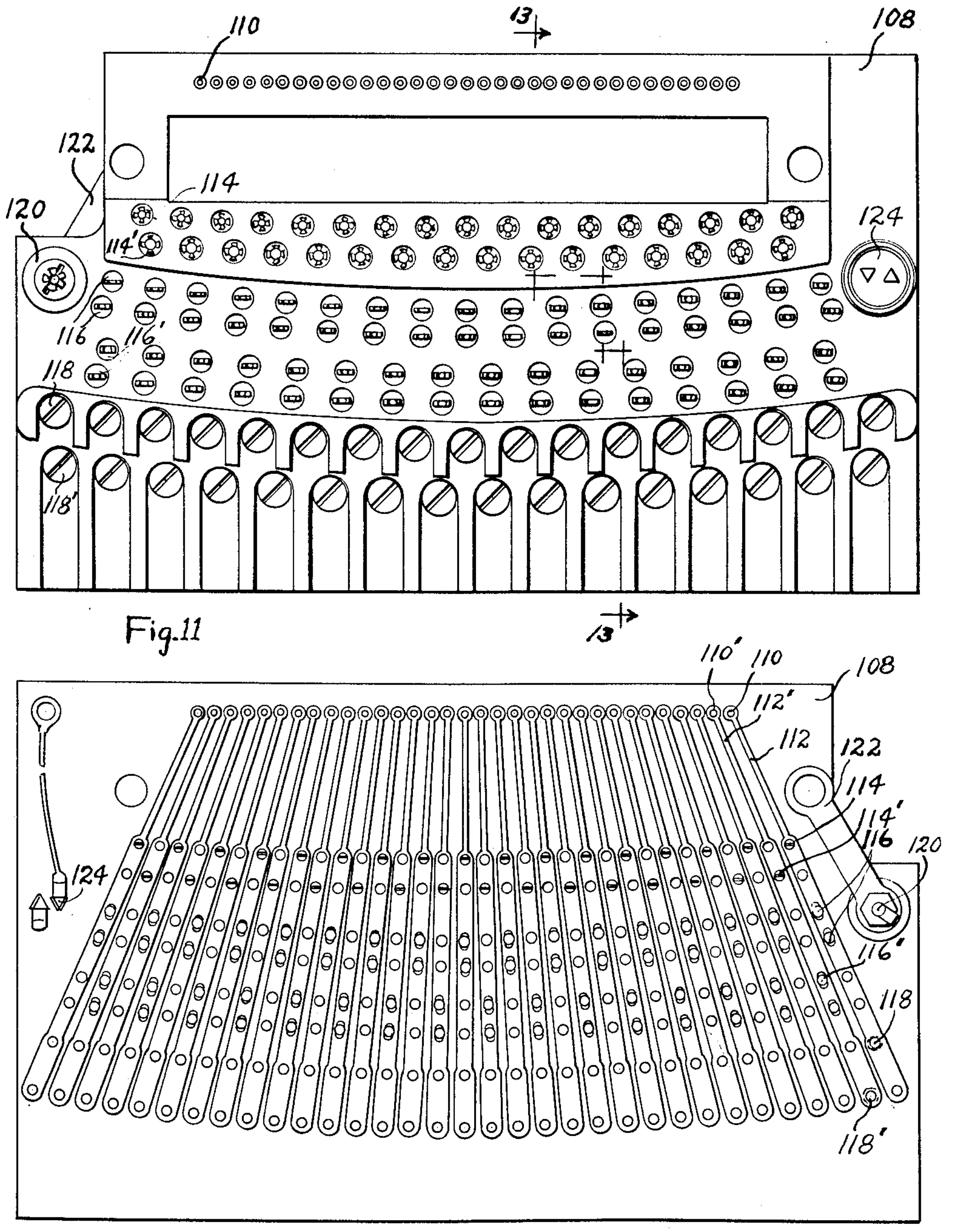
Fig. 11 is a plan view of the terminal board.
Fig. 12 is a bottom view of the terminal board.

The electrical connections between the recorder and the external recording circuits or channels (not shown) are made by means of a terminal board 106. As is best shown in Figs. 11 to 13, the terminal board comprises a molded plastic block 108 having near one of its edges a row of electrical sockets or jacks 110 each of which is adapted to receive the pin of a respective stylus electrode assembly 109 such as is described in detail hereinafter. Each jack 110 projects through the block 108 and its lower end connects with a respective strip 112 of an electrically conducting material which lies against the bottom surface of the block. The strip 112 also connects with the bottom end of a pin jack 114 and two connectors 116 similar to the connector shown and claimed in my Patent No. 2,640,185. A terminal screw 118 also threadingly engages the strip 112. The adjacent stylus electrode jack 110' is interconnected by a strip 112' with a pin jack 114, two connectors 116' and a screw 118'. The remaining jacks 110 are connected by their respective conducting strips in an analogous manner with similar jacks, connectors and screws so that any of the jacks can be connected with one output terminal of an associated recording circuit in any of a variety of manners which results in a very flexible arrangement that makes the recorder of particular value in experimental or laboratory work. The other output terminals of the recording circuits are brought to a common terminal jack 120 which is grounded to the enclosure 28 by a conducting strap 122 so that the common bar electrode 38 is at the same potential. A two-pole plug jack 124 is used to bring the operating power to the motor M by means of flexible leads, only the ends of which are shown.

The terminal board 106 is supported at one end by two lugs 126 (Fig. 2) which project inwardly from the boss 26 upon opposite sides of the housing 20. The other end of the terminal board 106 rests upon the top of an angle bracket 128 which is secured to the end wall of the paper feed enclosure 28, the board being secured to the bracket by two screws 130 that pass through apertures in the board to engage nuts 132 welded to the bottom of the bracket shelf portion. The terminal board connections are enclosed by a cover plate 131 secured by screws 133.

Figure 5:
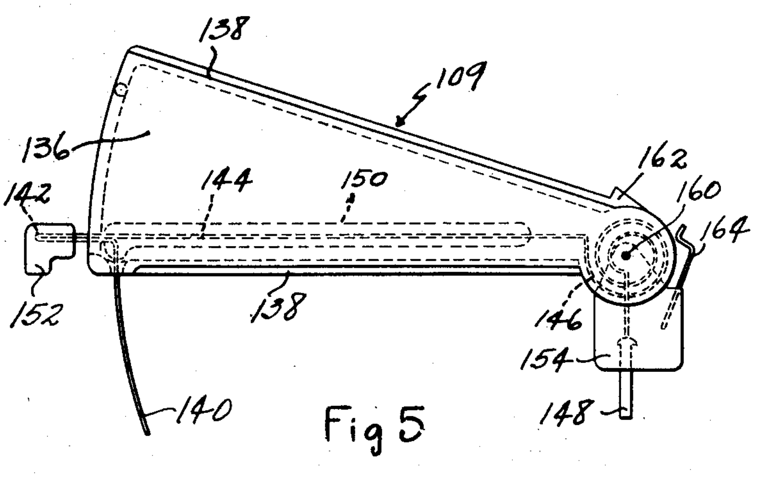
Fig. 5 is a side elevation view of the stylus electrode assembly.
Figure 6:
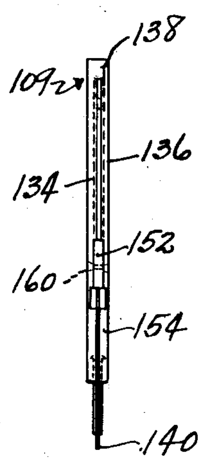
Fig. 6 is an end elevation view of the stylus electrode assembly.
Figures 7, 8, 9, 10:
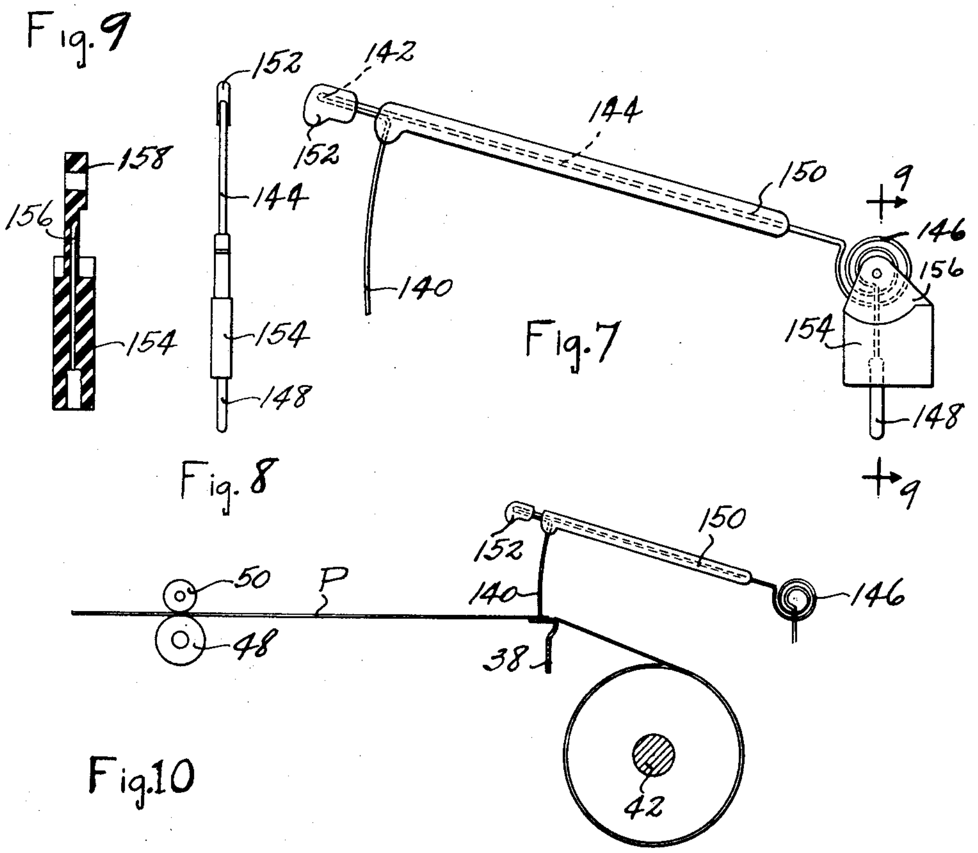
Fig. 7 is a side elevation view of the stylus.
Fig. 8 is an end elevation view of the stylus.
Fig. 9 is a sectional view on line 9—9 of Fig. 7.
Fig. 10 is a diagrammatic view showing the relationship of the stylus and bar electrodes to the web of recording material.

As is best shown in Figs. 5 and 6, the stylus electrode assembly 109 comprises a housing of two sector-shaped plates 134 and 136 of a plastic or other non-conducting material. The two angularly disposed straight sides of the plate 134 are provided with lips 138 which are stepped inwardly wherein the plate 136 is cemented so that a cavity is formed therebetween. In this cavity is carried an electrically conducting stylus formed of stainless steel wire whose effective marking portion 140 protrudes downwardly through an aperture in one end of the bottom side of the plate 134. As is best shown in Figs. 7 and 9, the effective portion 140 of the stylus wire is bent at right angles and then back upon itself as at 142 so as to lie adjacent a generally horizontal connecting portion 144. The connecting portion terminates in resilient means such as a spiral portion 146 which acts as a spring for forcing the tip 140 downwardly against the web P of recording material as is shown in Fig. 10. The innermost turn of the spiral portion 146 is brought out and soldered to a pin 148 for engaging one of the jacks 110 in the terminal board 106 to connect the stylus with an associated external recording circuit (not shown) by means of any of the various connectors which were described in detail heretofore.

Throughout most of the length of its horizontal connecting portion 144 the stylus wire is enclosed by a molded strip 150 of a plastic material which acts as a runner to facilitate the movement of the stylus electrode in the cavity formed by the side plates 134 and 136. A handle 152 is molded about the doubled back portion 142 of the stylus wire which protrudes beyond the open arcuate end of the side plates 134 and 136 so that the tip of the stylus electrode can be lifted manually from the web P against the force exerted by the spiral 146. The handle 152 also acts as a flag or indicator to give a visual indication of the wear of the stylus portion 140.

The upper end of the jack pin 148 is molded in a spacer 154 (Figs. 7 and 9) of a plastic material having a triangular portion 156 at the top of which is carried a spool 158. The spiral 146 encircles the spool 158 and the end is brought down through an aperture in the spacer 154 to enter the pin 148. As is best shown in Fig. 9, the axial length of the spool 158 is less than the thickness of the spacer 154 so that the side plates 134 and 136 are flush with the sides of the spacer 154 when the rounded ends of the plates are pivotally connected with the spool by a rivet 160 (Figs. 5 and 6). The side plate 134 is provided with an offset 162 which engages a latch spring 164 when the side plates are pivoted about the rivet 160 to a vertical position.

As can best be seen in Fig. 4, a plurality of stylus electrodes 109 similar to that described above are arranged in a row by plugging the pins 148 into the jacks 110 so that the tips of effective marking portions 140 contact the surface of the web P of recording paper opposite the common bar electrode 38. The row of stylus electrodes 109 are enclosed by a cover 166 which is pivoted upon the hinge pintles 94. With the electrical connecting pins 148 of the stylus electrodes 109 in the jacks 110, their pivotal rivets 160 are axially aligned with the axes of the hinge pintles 94 so that the lowering of the cover 166 simultaneously brings the stylus electrodes into their recording position shown in Figs. 2 and 4. In this position the individual spiral portions 146 bring the tips of the effective recording portions 140 of the stylus electrodes 109 through a row of apertures in the front end of the cover 104 into forcible contact with the surface of the web P of electrosensitive paper. The spiral portion 146 also provides a means for automatically compensating for wear and erosion of the effective recording portion 140. The horizontal connecting portion 144 of the stylus wire is positioned near the top of the cavity between the side plates 134 and 136 as shown in Fig. 2 before any wear has taken place to foreshorten the effective portion 140. As the effective recording portion 140 gradually becomes shorter due to wear and erosion during the recording process the horizontal connecting portion gradually descends under the spring action of the spiral 146 to the position shown in Fig. 5. The stylus electrode assembly 109 can then be replaced as a unit by lifting the cover 166 so that the side plates 134 and 136 of the old unit can be rotated to a vertical position wherein the offset 162 engages the spring latch 164. The old unit is then removed by extracting the pin 148 from the terminal board jack 110. The pin 148 of the new stylus electrode unit 109 is next inserted in the empty jack 110 and the cover 166 closed to bring the unit into recording position.

The web P of recording paper is also quickly and easily renewed by the releasing of the cover cams 103 and the lifting of the cover arms 90 to pivot the arms about the hinge pintles 94. The movement of the arms 90 conjointly lifts the cover 104, the stylus electrode assemblies 109 and cover 166 to open the supply roll compartment so that a new roll of electrosensitive material can be readily inserted in the brackets 44. The end of the web P is brought out over the common bar electrode 38 and along the pathway formed by the plates 52 and 56 so that the closing of the cover arms 90 brings the feed rolls 48 and 50 into contact with the web. It is to be noted that if a recording material is used which must be wet, the cover 104 bears against the web P substantially to seal the supply roll compartment so that the required humidity is maintained therein.

The feed roll motor M is energized from any conventional power source (not shown), the connection thereto being completed through the two-pole connector 124 in the terminal board 106. The feed rolls 48 and 50 are started by shifting the lever 80 from its neutral position to bring either the worm 66 or 68 into engagement with the gear 76. The stylus electrodes 109 are selectively energized from respective external recording circuits which form no part of the present invention and are not illustrated. It will be recognized that in many test or laboratory set-ups some of the external circuits will be relatively permanent where others will be temporary or used only once. Accordingly the one terminal of any permanent circuit is connected by soldering to one of the connectors 116 whereas a connection to a temporary external circuit is made by engaging one of the screws 118 by the end of a bare lead or by inserting a pin in one of the jacks 114. In any case the respective recording circuit as completed by the conducting strip 112, the jack 110, the pin 148, the stylus wire, the web P of recording paper, the common bar electrode 38 through ground to the common jack 120 which is connected to the other terminals of all the external circuits.

It should be understood that the present disclosure is for the purpose of illustration only and that this invention includes all modifications which fall within the scope of the appended claims.

I claim:

1. Apparatus for recording upon a recording medium having an electrode assembly including a conducting stylus whose length is relatively great with respect to its transverse dimensions, a housing enclosing said stylus, the opposed walls of the housing engaging said stylus to prevent lateral deflection thereof, said housing having an aperture therein through which the tip end of the stylus projects, the size of the aperture being only slightly greater than the transverse dimensions of the stylus to insure definite registry of the tip end with respect to the recording medium, spring means enclosed in said housing and connected with the stylus to urge the tip end through the aperture towards the recording medium thus compensating for wear and erosion, said housing being divided into two relatively movable parts one of which includes the tip end aperture, and a hinge pivotally connecting said housing parts to permit the tip end of the stylus to be lifted from the recording medium.

2. Apparatus for recording upon a recording medium having an electrode assembly including a conducting stylus whose length is relatively great with respect to its transverse dimensions, a housing enclosing said stylus, the opposed walls of the housing engaging said stylus to prevent lateral deflection thereof, said housing having an aperture therein through which the tip end of the stylus projects, the size of the aperture being only slightly greater than the transverse dimensions of the stylus to insure definite registry of the tip end with respect to the recording medium, the opposite end of the stylus having a spiral configuration to form a spring which is also enclosed within the housing, said spring urging the tip end of the stylus through the aperture towards the recording medium thus compensating for wear and erosion, said housing being divided into two relatively movable parts one of which includes the tip end aperture, and a hinge pivotally connecting said housing parts, the pivotal axis of the hinge coinciding with the central axis of the spring to permit the tip end of the stylus to be lifted from the recording medium.

3. Apparatus for recording upon a recording medium having an electrode assembly including an elongated conducting member whose length is relatively great with respect to its transverse dimensions, the tip of one end of the conducting member forming an effective recording stylus portion, a connecting portion one end of which extends substantially normally from the stylus portion, a housing enclosing said member, the opposed walls of the housing engaging said member to prevent lateral deflection thereof, said housing having an aperture therein through which the tip end of the member projects, the size of the aperture being only slightly greater than the transverse dimensions of the member to insure definite registry of the tip end with respect to the recording medium, the opposite end of the connecting portion having a spiral configuration to form a spring which is also enclosed within said housing, said spring urging the tip end through the aperture towards the recording medium thus compensating for wear and erosion, said housing being divided into two relatively movable parts one of which includes the tip end aperture, and a hinge pivotally connecting said housing parts, the pivotal axis of the hinge coinciding with the central axis of the spring to permit the tip end to be lifted from the recording medium.

4. Apparatus for recording upon a recording medium having an electrode assembly including an elongated conducting member whose length is relatively great with respect to its transverse dimensions, the tip of one end of the conducting member forming an effective recording stylus portion, a connecting portion, one end of which extends substantially normally from the stylus portion, a non-conducting housing enclosing said member to prevent lateral deflection thereof, said housing having an aperture therein through which the tip end of the member projects to insure definite registry thereof with respect to the recording medium, the opposite end of the connecting portion having a spiral configuration to form a spring which urges the tip end through the aperture to provide marking pressure, the spring also advancing the tip of the effective portion to compensate for wear and erosion, said housing being divided into two relatively movable parts, one of which includes the tip end, and a pivotal connection joining the housing parts, the pivotal axis coinciding with the central axis of the spring permitting the tip end to be lifted from the recording medium.

5. Apparatus for recording upon a recording medium having an electrode assembly including an elongated conducting member whose length is relatively great with respect to its transverse dimensions, the tip of one end of the conducting member forming an effective recording stylus portion, a connecting portion one end of which extends substantially normally from the opposite end of the stylus portion, a housing including two plates of non-conducting material located on either side of said member to prevent lateral deflection thereof, said housing having an aperture therein through which the tip end of the member projects to insure definite registry thereof with respect to the recording medium, the opposite end of the connecting portion having a spiral configuration to form a spring which urges the tip end through the aperture to provide marking pressure, the spring also advancing the tip of the stylus portion to compensate for wear and erosion.

6. Apparatus for recording upon a recording medium having an electrode assembly including an elongated conducting member whose length is relatively great with respect to its transverse dimensions, the tip of one end of the conducting member forming an effective recording stylus portion, a connecting portion one end of which extends substantially normally from one end of the stylus portion, and a sector-shaped housing including two plates of non-conducting material located on either side of said member to prevent lateral deflection thereof, said housing having an aperture in one straight side adjacent its arcuate side through which the tip end of the member projects to insure definite registry thereof with respect to the recording medium, the opposite end of the connecting portion having a spiral configuration to form a spring which urges the tip end through the aperture to provide marking pressure, the spring also advancing the tip of the stylus portion to compensate for wear and erosion.

7. Apparatus for recording upon a recording medium having an electrode assembly including an elongated conducting member whose length is relatively great with respect to its transverse dimensions, the tip of one end of the conducting member forming an effective recording stylus portion, a connecting portion one end of which extends substantially normally from one end of the stylus portion, and a substantially sector-shaped housing including two plates of non-conducting material located on either side of said member to prevent lateral deflection thereof, said housing having an aperture in one straight side adjacent its arcuate side through which the tip end of the member projects to insure definite registry thereof with respect to the recording medium, the housing having pivotal connection at the angle opposite the arcuate housing side, the opposite end of the connecting portion having a spiral configuration to form a spring which urges the tip end through the aperture to provide marking pressure, the spring also advancing the tip of the stylus portion to compensate for wear and erosion, the axis of the spiral coinciding with that of the housing pivotal connection so that the stylus portion can be lifted to remove the tip end from the surface of the recording medium.

8. Apparatus for recording upon a recording medium having an electrode assembly including an elongated conducting member whose length is relatively great with respect to its transverse dimensions, the tip of one end of the conducting member forming an effective recording stylus portion, a connecting portion one end of which extends substantially normally from one end of the stylus portion, and a housing for said member including a stationary portion and a movable portion pivotally attached thereto, said movable portion having two sector-shaped plates of non-conducting material located on either side of said member to prevent lateral deflection thereof, said housing having an aperture in one straight side adjacent its arcuate side through which the tip end of the member projects to insure definite registry thereof with respect to the recording medium, the opposite end of the connecting portion having a spiral configuration whose axis coincides with that of the pivot to form a spring which urges the tip end through the aperture to provide marking pressure, the spring also advancing the tip of the stylus portion to compensate for wear and erosion, the conducting member being introduced into the stationary portion of the housing at the axis of the spiral thereby eliminating any moving electrical contacts or brushes.

9. Apparatus for recording upon a recording medium having an electrode assembly including an elongated member whose length is relatively great with respect to its transverse dimensions, the tip of one end of the conducting member forming an effective recording stylus portion, a connecting portion one end of which extends substantially normally from the opposite end of the stylus portion, and a sector-shaped housing including two plates of non-conducting material located on either side of said member to prevent lateral deflection thereof, said housing having an aperture in one straight side adjacent its arcuate side through which the tip end of the member projects to insure definite registry thereof with respect to the recording medium, the end of the connecting portion adjoining the stylus portion extending beyond the arcuate side of the housing to indicate the amount of wear of the stylus portion, the opposite end of the connecting portion having a spiral configuration to form a spring which urges the tip end through the aperture to provide marking pressure, the spring also advancing the tip of the stylus portion to compensate for wear and erosion.

10. Apparatus for recording upon a recording medium comprising a plurality of conducting stylus electrodes the length of each of which is relatively great with respect to its transverse dimensions, a non-conducting housing enclosing respectively each of said electrodes to prevent lateral deflection thereof, each of said housings having an aperture therein through which one end of the associated stylus electrode projects to insure definite registry thereof with respect to the recording medium, the opposite end of each electrode having a spiral configuration to form a spring for yieldably urging the corresponding electrode toward the recording medium to provide marking pressure, the spring also advancing the tip of the associated electrode to compensate for wear and erosion, each of said housings having a pivotal connection, the pivotal axes of the connections coinciding with the central axes of the springs thereby permitting the stylus electrodes to be lifted from the recording medium, and means for conjointly engaging the stylus electrodes to bring them into their recording positions.

11. Apparatus for recording upon a recording medium comprising a plurality of elongated conducting members, the tip of one end of each of which forms a stylus portion whose length is relatively great with respect to its transverse dimensions, a connecting portion one end of which extends substantially normally from the opposite end of the stylus portion, a non-conducting housing enclosing respectively each of said members to prevent lateral deflection thereof, said housing having an aperture therein through which the tip end of the member projects to insure definite registry thereof with respect to the recording medium, the opposite end of each connecting portion having a spiral configuration to form a spring for yieldably urging the tip end of the corresponding stylus portion toward the recording medium to provide marking pressure, the springs also advancing the tip ends of the stylus portions to compensate for wear and erosion, each of said housings being divided into two relatively movable parts one of which includes the tip end aperture, and a pivotal connection joining the housing parts, the pivotal axes of the connections coinciding with the central axes of the springs thereby permitting the stylus portions to be lifted from the recording medium.

12. A recorder for impressing upon a web of electrosensitive recording material traces corresponding to signals from a plurality of input circuits comprising means defining a pathway for the web of recording material, feeding means for continuously moving the web along said pathway, a plurality of stylus electrodes having effective recording portions which are disposed in a transverse plane substantially normal to said pathway, a plurality of spiral spring elements each yieldably maintaining the tip end of a corresponding stylus electrode in contact with one surface of the web to compensate for wear and erosion of the tip end, a common electrode located upon the opposite side of the web from the tip ends of the stylus electrodes, and electrical connections interposed between each of the stylus electrodes and one side of a respective input circuit, the other sides of the input circuits all being connected to the common electrode so that a marking current flows through the stylus electrodes and the adjacent portions of the web to record traces upon the web when the corresponding input circuits are energized.

13. A recorder for impressing upon a web of electrosensitive recording material traces corresponding to signals from a plurality of input circuits comprising means defining a pathway for the web of recording material, feeding means for continuously moving the web along said pathway, a plurality of stylus electrodes having effective recording portions which are disposed in a transverse plane substantially normal to said pathway, disconnecting means for separately removing each of said stylus electrodes so that it can be replaced without disturbing the other electrodes, a plurality of spiral spring elements each yieldably maintaining the tip end of a corresponding stylus electrode in contact with one surface of the web to compensate for wear and erosion of the tip end, a common electrode located upon the opposite side of the web from the tip ends of the stylus electrodes, and electrical connections including said disconnecting means interposed between each of the stylus electrodes and one side of a respective input circuit, the other sides of the input circuits all being connected to the common electrode so that a marking current flows through the stylus electrodes and the adjacent portions of the web to record traces upon the web when the corresponding input circuits are energized.

14. A recorder for impressing upon a web of electrosensitive recording material traces corresponding to signals from a plurality of input circuits comprising means defining a pathway for the web of recording material, feeding means for continuously moving the web along said pathway, a plurality of stylus electrodes having effective recording portions which are disposed in a transverse plane substantially normal to said pathway, a plurality of jacks disposed transversely of said pathway, a pin extending from the end of each stylus electrode for engaging a corresponding one of said jacks, a plurality of spiral spring elements each yieldably maintaining the tip end of a corresponding stylus electrode in contact with one surface of the web to compensate for wear and erosion of the tip end, a common electrode located upon the opposite side of the web from the tip ends of the stylus electrodes, and electrical connections each including a corresponding pin and jack interposed between each of the stylus electrodes and one side of a respective input circuit, the other sides of the input circuits all being connected to the common electrode so that a marking current flows through the stylus electrodes and the adjacent portions of the web to record traces upon the web when the corresponding input circuits are energized.

15. A recorder for impressing upon a web of electrosensitive recording material traces corresponding to signals from a plurality of input circuits comprising means defining a pathway for the web of recording material, feeding means for continuously moving the web along said pathway, a plurality of stylus electrodes having effective recording portions which are disposed in a transverse plane substantially normal to said pathway, an insulating terminal board disposed transversely of said pathway, a plurality of jacks disposed in spaced relationship in the terminal board, a pin extending from the end of each stylus electrode for engaging a corresponding one of said jacks, a plurality of spiral spring elements each yieldably maintaining the tip end of a corresponding stylus electrode in contact with one surface of the web to compensate for wear and erosion of the tip end, a common electrode located upon the opposite side of the web from the tip ends of the stylus electrodes, and electrical connections each including a corresponding pin and jack interposed between each of the stylus electrodes and one side of a respective input circuit, the other sides of the input circuits all being connected to the common electrode so that a marking current flows through the stylus electrodes and the adjacent portions of the web to record traces upon the web when the corresponding input circuits are energized.

16. A recorder for impressing upon a web of electrosensitive recording material traces corresponding to signals from a plurality of input circuits comprising means defining a pathway for the web of recording material, feeding means for continuously moving the web along said pathway, a plurality of stylus electrodes having effective recording portions which are disposed in a transverse plane substantially normal to said pathway, an insulating terminal board disposed transversely of said pathway, a plurality of conducting strips disposed in spaced relationship along said board, a plurality of input connectors electrically linked with each of said strips for connecting with one side of an input circuit, a plurality of jacks carried by said board and connected with a respective strip, a pin extending from the end of each stylus electrode for engaging a corresponding one of said jacks, a plurality of spiral spring elements each yieldably maintaining the tip end of a corresponding stylus electrode in contact with one surface of the web to compensate for wear and erosion of the tip end, and a common electrode located upon the opposite side of the web from the tip ends of the stylus electrodes, the other sides of the input circuits all being connected to the common electrode so that a marking current flows through the stylus electrodes and the adjacent portions of the web to record traces upon the web when the corresponding input circuits are energized.

17. A recorder for electrically impressing traces upon a web of moist electrosensitive recording material comprising a housing with a compartment for storing the web of moist recording material, an electrically nonconducting cover for the compartment, means for withdrawing the web from the compartment past the cover, a plurality of stylus electrodes having recording tips which contact one surface of the portion of the web being withdrawn from the compartment, and a common bar electrode contacting the opposite side of the web and disposed adjacent the cover to form in conjunction therewith a seal for maintianing the humidity within the compartment.

18. A recorder for electrically impressing traces upon a web of moist electrosensitive recording material comprising a housing with a compartment for storing the web of moist recording material, an electrically non-conducting cover for the compartment hinged to said housing, means for withdrawing the web from the compartment past the edge of the cover, a plurality of stylus electrodes having recording tips which contact one surface of the portion of the web adjacent the cover edge as the web is being withdrawn from the compartment, and a common bar electrode contacting the opposite side of the web and disposed adjacent the edge of the cover to form in conjunction therewith a seal for maintaining the humidity within the compartment.

19. A recorder for electrically impressing traces upon a web of moist electrosensitive recording material comprising a housing with a compartment for storing the web of moist recording material, an electrically non-conducting cover for the compartment hinged to said housing, means for withdrawing the web from the compartment past the edge of the cover, a plurality of stylus electrodes having recording tips, said cover having a plurality of spaced apertures disposed adjacent said cover edge through which apertures the respective tips of the stylus electrodes project to contact one surface of the web so that the recording action takes place before the web is exposed to atmosphere, and a common bar electrode contacting the opposite side of the web, the bar electrode being located to form in conjunction with the edge of the cover a seal for maintaining the humidity within the compartment.

References Cited in the file of this patent

UNITED STATES PATENTS

| | | |
|---|---|---|
| 946,304 | Zander | Jan. 10, 1910 |
| 2,557,196 | Nelson | June 19, 1951 |
| 2,568,306 | Stamper | Sept. 18, 1951 |
| 2,590,554 | Lukacs | Mar. 25, 1952 |
| 2,607,654 | Ridings et al. | Aug. 19, 1952 |
| 2,615,777 | Deuth | Oct. 28, 1952 |
| 2,627,448 | Horton | Feb. 3, 1953 |